US012756521B2

(12) United States Patent
Liu et al.

(10) Patent No.: US 12,756,521 B2
(45) Date of Patent: Oct. 6, 2026

(54) SRS CONFIGURATIONS AND SRS TRANSMISSION

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 736 days.

(21) Appl. No.: 17/269,143

(22) PCT Filed: Aug. 17, 2018

(86) PCT No.: PCT/CN2018/101037
§ 371 (c)(1),
(2) Date: Feb. 17, 2021

(87) PCT Pub. No.: WO2020/034188
PCT Pub. Date: Feb. 20, 2020

(65) Prior Publication Data
US 2022/0216968 A1 Jul. 7, 2022

(51) Int. Cl.
*H04L 5/00* (2006.01)
*H04W 72/0446* (2023.01)

(52) U.S. Cl.
CPC ....... *H04L 5/0053* (2013.01); *H04W 72/0446* (2013.01)

(58) Field of Classification Search
CPC ... H04L 5/0007; H04L 5/0051; H04L 5/0053; H04L 5/0094; H04L 5/009; H04W 72/0446
See application file for complete search history.

(56) References Cited

U.S. PATENT DOCUMENTS

2012/0113967 A1* 5/2012 Smith .................. H04B 1/7143
375/E1.033
2014/0016576 A1 1/2014 Noh
(Continued)

FOREIGN PATENT DOCUMENTS

CN 102026298 A 4/2011
CN 104137461 A 11/2014
(Continued)

OTHER PUBLICATIONS

Mitsubishi Electric, Views on SRS virtual cell ID, 3GPP TSG RAN WG1 Meeting #94, R1-1808446, Aug. 20-24, 2018, pp. 1-3, Gothenburg, Sweden.
(Continued)

*Primary Examiner* — Zhensheng Zhang
(74) *Attorney, Agent, or Firm* — Kunzler Needham & Hilton

(57) ABSTRACT

Methods and apparatuses for SRS enhancement are disclosed. In one embodiment, a method comprises configuring one or more cell IDs for SRS; and sending the configured cell ID(s) for SRS using higher layer signaling. In some embodiment, the method further comprises determining reserved transmission resources only for SRS transmission; and transmitting resource configuration parameters for the reserved transmission resources.

20 Claims, 7 Drawing Sheets

(56) References Cited

U.S. PATENT DOCUMENTS

| | | | | |
|---|---|---|---|---|
| 2014/0036737 | A1* | 2/2014 | Ekpenyong | H04L 5/0035 370/328 |
| 2016/0081084 | A1* | 3/2016 | Blankenship | H04W 72/0446 370/329 |
| 2018/0049203 | A1* | 2/2018 | Xue | H04L 5/0058 |
| 2021/0076371 | A1* | 3/2021 | Bhamri | H04W 64/006 |

FOREIGN PATENT DOCUMENTS

| | | | | |
|---|---|---|---|---|
| CN | 104521156 | A | 4/2015 | |
| CN | 105122679 | A | 12/2015 | |
| CN | 110138529 | A * | 8/2019 | H04L 5/0053 |
| EP | 3745625 | A1 * | 12/2020 | H04B 1/713 |
| WO | 2013169966 | A1 | 11/2013 | |
| WO | 2014007493 | A1 | 1/2014 | |

OTHER PUBLICATIONS

Qualcomm Incorporated, Virtual cell ID for SRS, 3GPP TSG RAN WG1 Meeting #94, R1-1809038, Aug. 20-24, 2018, pp. 1-2, Gothenburg, Sweden.

Samsung, Cross Carrier Indication for Semi-Persistent SRS MAC CE, 3GPP TSG-RAN WG2 Meeting #102, R2-1807639, May 21-25, 2018, pp. 1-2, Busan, Korea.

Nokia, Nokia Shanghai Bell, Introduction of virtual cell id for SRS, 3GPP TSG-RAN WG1 Meeting #94, R1-1809377, Aug. 20-24, 2018, pp. 1-2, Gothenburg, Sweden.

International Searching Authority, "Notification of Transmittal of the International Search Report and the Written Opinion of the International Searching Authority, or the Declaration", PCT/CN2018/101037 Aug. 17, 2018, pp. 1-6.

* cited by examiner

SRS CONFIGURATIONS AND SRS TRANSMISSION

FIELD

The subject matter disclosed herein generally relates to wireless communications and, more particularly, to SRS (Sounding Reference Signal) configurations and SRS transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Physical Uplink Shared Channel (PUSCH), Sounding Reference Signal (SRS), Time division multiplexing (TDM), Code division multiplexing (CDM), Orthogonal Cover Code (OCC), Cycling Shift (CS), Physical Resource Block (PRB), Hybrid Automatic Repeat Request-Acknowledge (HARQ-ACK), Media Access Control-Control Element (MAC-CE).

SRS (Sounding Reference Signal) capacity and coverage are important factors of network performance. Traditionally, the SRS transmission can only be made in the last symbol of a normal subframe. In addition, all UEs in a cell share a common cell ID. Therefore, SRS resources that are available to the UEs in one cell are limited to the SRS sequences generated based on the common cell ID.

BRIEF SUMMARY

Methods and apparatuses for SRS enhancement are disclosed.

In one embodiment, a method comprises configuring one or more cell IDs for SRS and sending the configured cell ID(s) for SRS using higher layer signaling.

In some embodiment, the method further comprises determining reserved transmission resources only for SRS transmission and transmitting resource configuration parameters for the reserved transmission resources.

In some embodiment, one or two symbols in the reserved transmission resources are used for one SRS resource of one remote unit. The reserved transmission resources are within a whole subframe or a second slot of a subframe. In the condition that the reserved transmission resources are within the whole subframe, a symbol index of the reserved transmission resources is a 14-bit bitmap; and in the condition that the reserved transmission resources are within the second slot of the subframe, the symbol index of the reserved transmission resources is a 7-bit bitmap. In the condition that two symbols in the reserved transmission resources are used for one SRS resource of one remote unit, the resource configuration parameters for one remote unit include an OCC index. The reserved transmission resources may be configured periodically. Alternatively, the reserved transmission resources may be configured aperiodically.

In some embodiment, the configured cell ID(s) for SRS is added to RRC configuration for each SRS resource. In the condition that only one cell ID for SRS is configured for aperiodic SRS, the configured cell ID for SRS is used as a virtual cell ID for SRS. In the condition that more than one cell ID for SRS is configured for aperiodic SRS, the method further comprises sending a cell ID indicator for indicating which cell ID for SRS is the virtual cell ID for SRS. The cell ID indicator may be contained in a MAC CE selection command. The virtual cell ID for SRS indicated by the cell ID indicator is valid after M subframes from the subframe on which the PDSCH carrying the MAC CE selection command is transmitted, wherein M is equal to or larger than 4.

In another embodiment, a base unit comprises a processor that configures one or more cell IDs for SRS and a transmitter that sends the configured cell ID(s) for SRS using higher layer signaling. In some embodiment, the processor further determines reserved transmission resources only for SRS transmission and the transmitter further transmits resource configuration parameters for the reserved transmission resources.

In yet another embodiment, a method comprises receiving configured cell ID(s) for SRS using higher layer signaling and generating SRS sequence using a determined virtual cell ID for SRS. In some embodiment, the method further comprises receiving resource configuration parameters determining reserved transmission resources according to the received resource configuration parameters; and transmitting SRS resources using the reserved transmission resources.

In further embodiment, a remote unit comprises a receiver that receives configured cell ID(s) for SRS using higher layer signaling; and a processor that generates SRS sequence using a determined virtual cell ID for SRS. In some embodiment, the receiver further receives resource configuration parameters and the processor further determines reserved transmission resources according to the received resource configuration parameters; and the remote unit further comprises a transmitter that transmits SRS resources using the reserved transmission resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
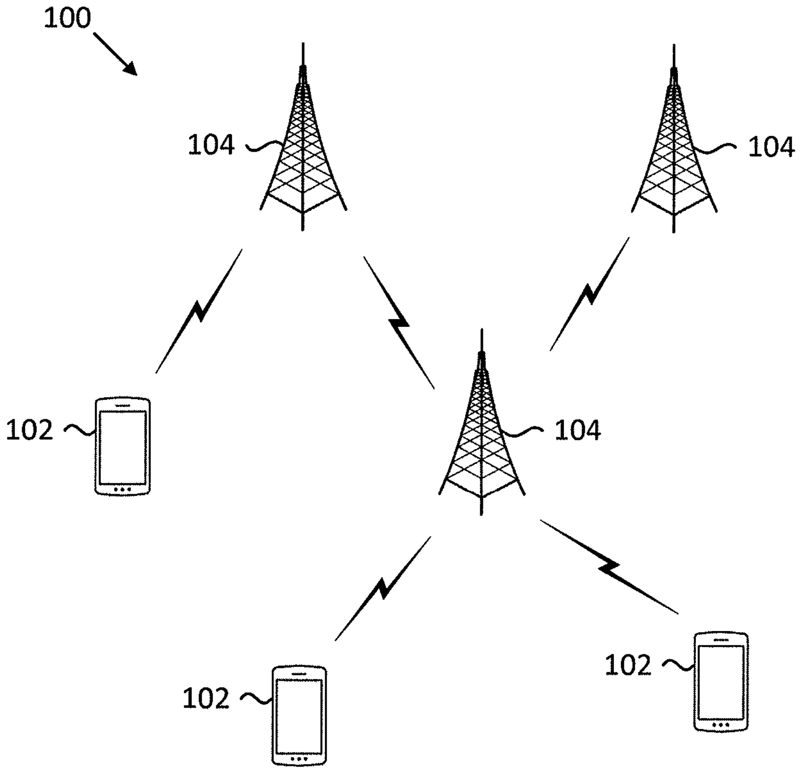
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for SRS enhancement. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals. A remote unit may connect to a base unit that serves one or more cells.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with LTE(4G). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
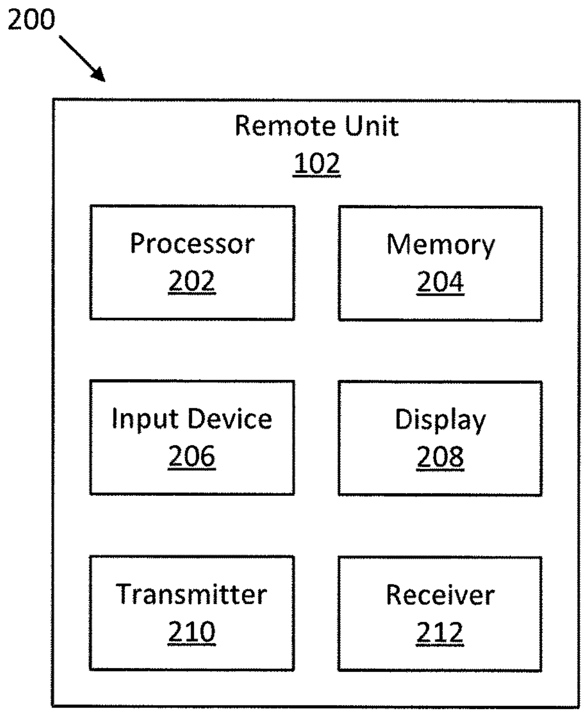
FIG. 2 is a schematic block diagram illustrating one embodiment of an apparatus that may be used for SRS enhancement.

FIG. 2 depicts one embodiment of an apparatus 200 that may be used for SRS enhancement. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
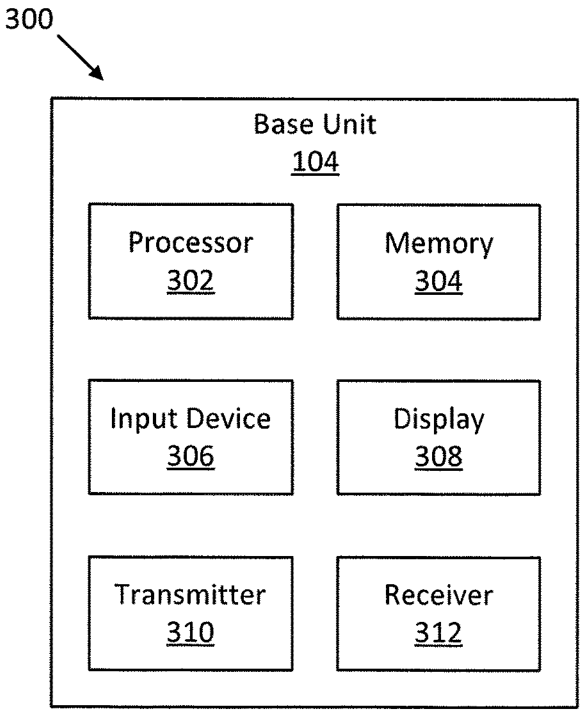
FIG. 3 is a schematic block diagram illustrating one embodiment of an apparatus that may be used for SRS enhancement.
Figure 4A:
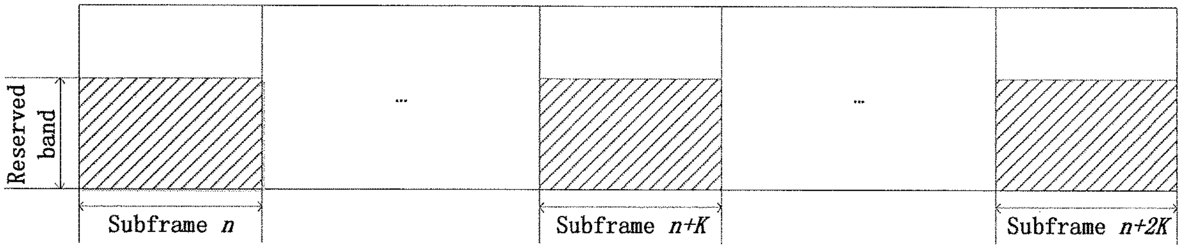
FIGS. 4*a*-4*d* illustrate reserved transmission resources for SRS transmission with different configurations.
Figure 4B:
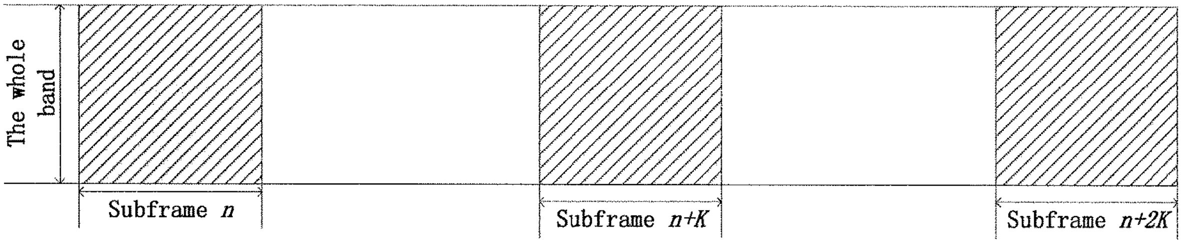
Figure 4C:
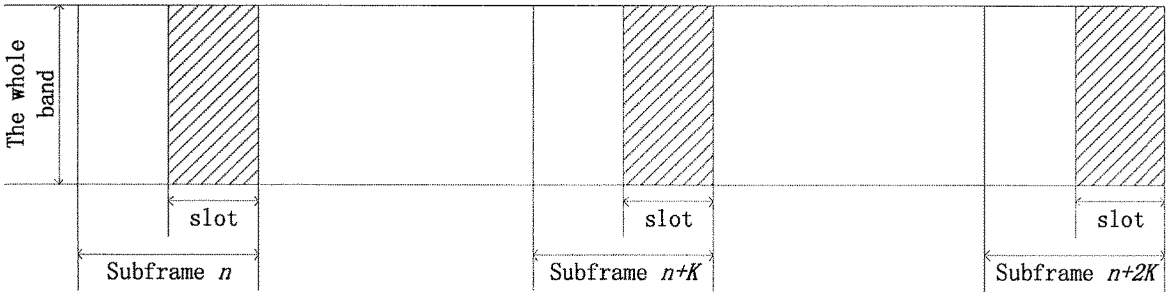
Figure 4D:
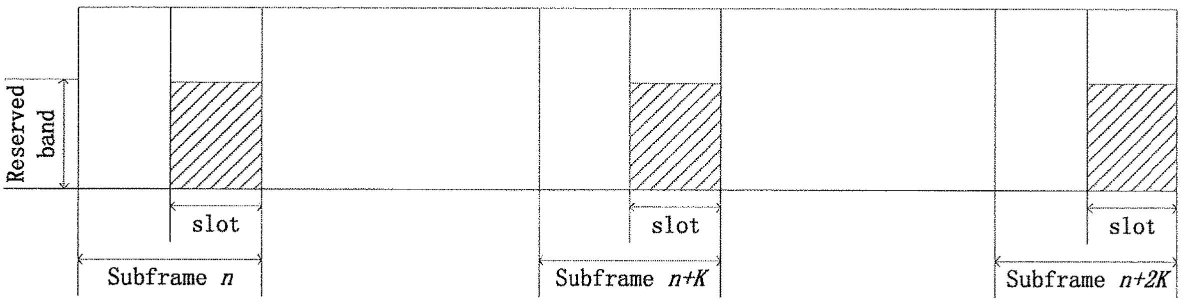

FIG. 3 depicts one embodiment of an apparatus 300 that may be used for SRS enhancement. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Traditionally, SRS resources are only transmitted in the last symbol of a normal subframe. In a first embodiment, eNB may reserve certain transmission resources only for SRS transmission. FIG. 4 illustrates reserved transmission resources for SRS transmission with different configurations. In FIG. 4(*a*), a partial band of a subframe is reserved as transmission resources only for SRS transmission; in FIG. 4(*b*), a whole band of a subframe is reserved as transmission resources only for SRS transmission; in FIG. 4(*c*), a whole band of a second slot of the subframe is reserved as transmission resources only for SRS transmission; in FIG. 4(*d*), a partial band of a second slot of the subframe is reserved as transmission resources only for SRS transmission.

In summary, the whole band or a partial band of a subframe may be reserved. In addition, a whole subframe or a second slot of the subframe may be reserved. In particular, the detailed configuration parameters for the reserved transmission resources only for SRS transmission are as follows:

(1) Periodicity;

(2) Time duration of one reserved transmission resource;

(3) Bandwidth of the reserved transmission resource.

These parameters may be sent to all UEs within a cell through higher layer signaling.

Take FIG. 4*a*-4*d* as an example, the periodicity for all four situations is K, in which K is an integer that is greater than 1.

The time duration of one reserved resource may be a subframe or a slot. In the examples illustrated in FIGS. 4*a* and 4*b*, the time duration is a subframe. In the other two examples illustrated in FIGS. 4*c* and 4*d*, the time duration is a slot. Preferably, the time duration is a second slot of a subframe.

The bandwidth of the reserved resource may correspond to a whole band or a partial band. In examples illustrated in FIGS. 4*a* and 4*d*, the bandwidth of the reserved resource corresponds to a partial band. In the other two examples illustrated in FIGS. 4*b* and 4*c*, the bandwidth of the reserved resource is represented by the whole band. The bandwidth itself may be represented by the number of allocated PRBs.

The SRS resources would be transmitted in the reserved transmission resources. On the other hand, if no SRS resources are necessary to be transmitted, the reserved transmission resources may be scheduled for a PUSCH transmission.

Reserving reserved transmission resources only for SRS resources may avoid potential interference between PUSCH transmissions and SRS transmissions.

In addition to the last symbol, in the first embodiment, all symbols of a subframe or of a slot may be used to transmit SRS resources. One or two symbols in the reserved transmission resources may be used for one SRS resource of one UE. Different SRS resources for different UEs within one cell may be multiplexed in one subframe (or one slot) using a TDM manner and/or a CDMmanner. In the CDM manner, the multiplexing can be implemented by using different OCC codes or using different CS values.

For example, Length-2 OCC in the time domain, i.e. {[1 1], [1 −1]}, are used for the SRS multiplexing for 2 UEs if 2 symbols are used for the SRS resources for each UE.

Figure 5:
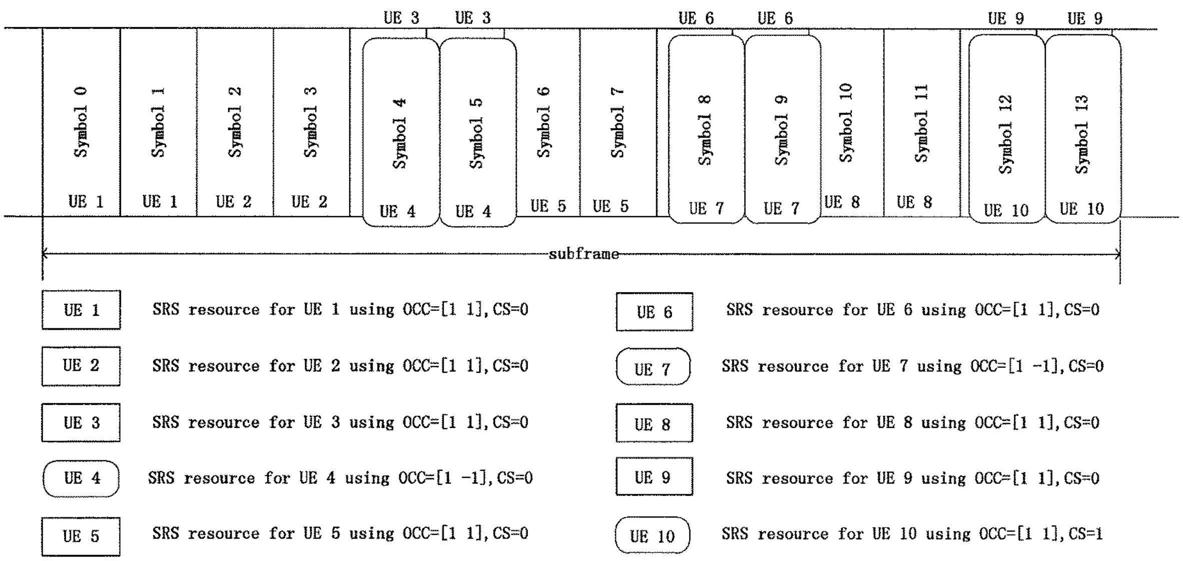
FIG. 5 illustrates SRS resources for different UEs in one reserved subframe.

As illustrated in FIG. 5, SRS resources for UEs 1-10 are transmitted in fourteen symbols that are contained in one reserved subframe. In FIG. 5, each of the UEs 1-10 uses two symbols. SRS resources for UE 1, UE 2, UE 5 and UE 8 are multiplexed by using different symbols, i.e., in a TDM manner. SRS resources for UE 3 and UE 4 are multiplexed by using different OCC codes, i.e. [1 1] and [1−1], respectively. SRS resources for UE 6 and UE 7 are multiplexed in the same manner as UE 3 and UE 4, i.e., in a CDM manner by using different OCC codes. SRS resources for UE9 and UE 10 are also multiplexed in a CDM manner by using different CS values, i.e. CS=0 and CS=1, respectively.

The following two parameters, among other parameters (including CS values), are configured for periodic SRS transmission through higher layer signaling:

(1) Symbol index in the reserved subframe/slot for one SRS resource;

(2) OCC index.

The symbol index may be a 14-bit bitmap for a reserved subframe or a 7-bit bitmap for a reserved slot. UE receiving the symbol index would understand which symbols it should use for transmitting its own SRS resources. For example, if a corresponding bit in the bitmap is set to (indicated as) ‘1’, the indicated symbol may be used for the UE to transmit the SRS resources, while if a corresponding bit in the bitmap is set to ‘0’, the corresponding symbol would NOT be used for the UE to transmit the SRS resources.

If 2 symbols are used for one SRS resource, the OCC index may be: index 0 corresponding to [1 1] or index 1 corresponding to [1−1].

For example, the eNB could configure symbolIndex=‘00001100000000’ and OCCIndex=‘0’ for the UE 3 in FIG. 5.

For aperiodic SRS and DCI format 4/4A/4B, the symbol index and OCC index should be added in SRS parameter set defined in the srs-ConfigApDCI-Format4.

For aperiodic SRS and DCI format 0/0A/0B/6-0A/7-0A, the symbol index and OCC index should be added in the SRS parameter set defined in srs-ConfigApDCI-Format0.

For aperiodic SRS and DCI format 1A/2B/2C/2D/6-1A/7-1A, the symbol index and OCC index should be added in the SRS parameter set defined in srs-ConfigApDCI-Format1a2b2c.

For aperiodic SRS and DCI format 3B with one or more SRS request fields, the symbol index and OCC index should be added in the SRS parameter set defined in srs-ConfigApDCI-Format1a2b2c for 1-bit SRS request field or be added in the SRS parameter set defined in the srs-ConfigApDCI-Format4 for 2-bit SRS request field.

A UE configured for aperiodic SRS transmission, upon detection of a positive SRS request in subframe n, would commence SRS transmission in the first valid reserved subframe satisfying n+k, k≥4, in which k is predetermined between the eNB and the UE.

If one SRS request value is associated with more than one SRS parameter set for one UE, then the UE would commence SRS transmission in the first valid subframe satisfying n+k (k≥4) upon detection of a positive SRS request in subframe n.

For example, two different SRS parameter sets are associated with each SRS request value as defined in Table 1. The SRS resources configured by the $1^{st}$, $3^{rd}$, or $5^{th}$ SRS parameter sets may only be transmitted on the last symbol of the normal subframe. The SRS resources configured by the $2^{nd}$, $4^{th}$ or $6^{th}$ SRS parameter set may be transmitted in the reserved transmission resources.

TABLE 1

SRS request value for aperiodic SRS in DCI format 4/4A/4B

| Value of SRS request field | SRS parameter sets |
|---|---|
| ‘00’ | No aperiodic SRS trigger |
| ‘01’ | The $1^{st}$ SRS parameter set configured by higher layers |
| | The $2^{nd}$ SRS parameter set configured by higher layers |
| ‘10’ | The $3^{rd}$ SRS parameter set configured by higher layers |
| | The $4^{th}$ SRS parameter set configured by higher layers |
| ‘11’ | The $5^{th}$ SRS parameter set configured by higher layers |
| | The $4^{th}$ SRS parameter set configured by higher layers |

Figure 6:
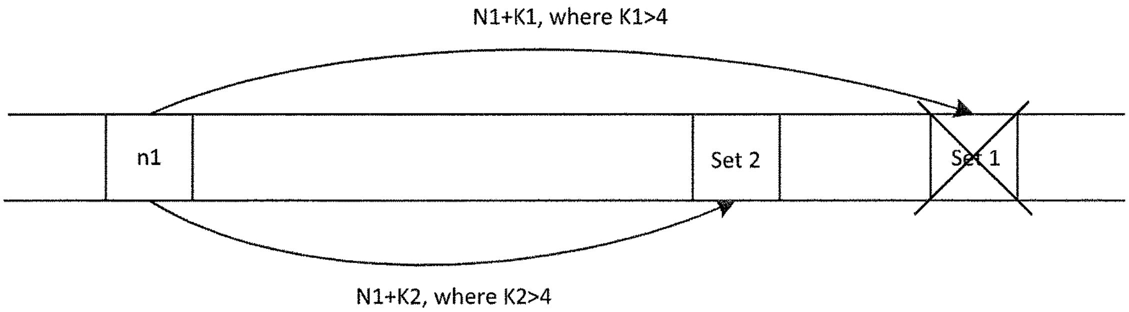
FIG. 6 illustrates a schematic diagram illustrating a subframe selection for two SRS parameter sets associating with one SRS request value.

For example, as shown in FIG. 6, two SRS parameter sets, i.e. “Set 1” and “Set 2”, are associated with the same SRS request value for the UE, and the corresponding SRS request value is detected by the UE in subframe n1. The UE finds the first valid subframes n1+K1 and n1+K2 to transmit SRS signals related to “Set 1” and “Set 2”, respectively, as shown in FIG. 6, where K2>4 and K1>4. The UE shall only commence SRS transmission in the subframe n1+K2 configured by SRS parameter set “Set 2” because, for example, this subframe is associated with an earlier valid resource. Hence, the SRS configured by “Set 1” would be ignored because it is associated with a later valid resource and because one SRS request can only trigger one aperiodic SRS transmission.

Figure 7:
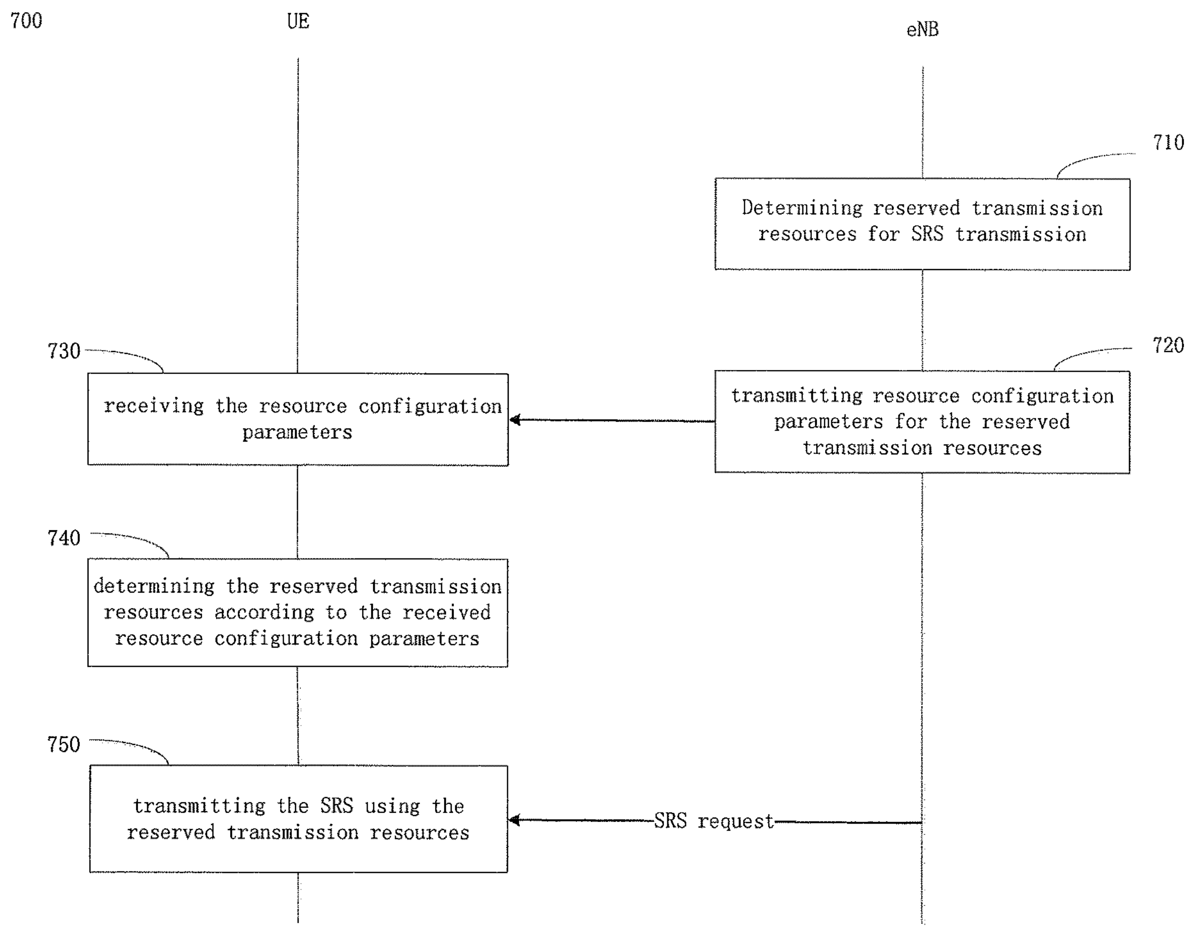
FIG. 7 is a flow chart diagram illustrating reserving transmission resources.

FIG. 7 depicts a method (700) for reserving transmission resources. In step 710, the eNB determines a set of reserved transmission resources for SRS transmission. In particular, the transmission resources, for example, as shown in FIGS. 4(*a*)-4(*d*), can be represented by resource configuration parameters of periodicity, time duration and bandwidth. In addition, the detailed transmission resources for each UE in one frame or in one slot illustrated in FIG. 5 are represented by resource configuration parameters of at least the symbol index and OCC index. In step 720, the resource configuration parameters for the reserved transmission resources are transmitted to the UE using higher layer signaling. In step 730, the UE receives the resource configuration parameters. In step 740, the UE determines the reserved transmission resources according to the received resource configuration parameters. In step 750, upon receiving a SRS request, the UE transmits the SRS using valid reserved transmission resources.

Below is a description of a virtual cell ID for SRS.

Traditionally, all UEs within a cell share a common cell ID, i.e., $N_{ID}^{cell}$. The SRS resources can be only generated based on the common cell ID. That is to say, all UEs within the cell may only use the SRS sequence generated based on the common cell ID. As a matter of fact, only 32 available SRS resources may be generated based on one cell ID with four transmission combs, i.e. four different subcarrier groups, and eight usable cyclic shifts in a cell. Therefore, the available SRS resources are limited.

According to a second embodiment, a virtual cell ID for SRS is introduced. The virtual cell ID may be configured by the eNB so that the UE may use the virtual cell ID in addition to the common cell ID, to generate more SRS resources.

For periodic SRS, a cell ID for SRS Cell-ID-SRS, i.e. $n_{ID}^{SRS}$, would be directly configured for each SRS resource through a higher layer parameter. A new field Cell-ID-SRS $n_{ID}^{SRS}$ is added to RRC configuration for each SRS resource. If the new field is not configured, the default cell ID is cell ID $N_{ID}^{cell}$, which is the common cell ID for the cell.

For example, the eNB could configure the following higher layer parameter to the UE.

SoundingRS-UL-ConfigDedicated-v16::=SEQUENCE {nSRS-Identity-r16 INTEGER (0 . . . 503)}

For aperiodic SRS, the eNB could configure one or more Cell-ID-SRS parameters for the UE through higher layer signaling.

For example, two Cell-ID-SRSs, i.e., $n_{ID}^{SRS,0}$ and $n_{ID}^{SRS,1}$, are configured as follows through dedicated RRC signaling:

| | |
|---|---|
| SoundingRS-UL-ConfigDedicated-v16 ::= | SEQUENCE { |
| nSRS-Identity-r16 | INTEGER (0..503) |
| nSRS-Identity1-r16 | INTEGER (0..503)} |

Alternatively, the two Cell-ID-SRSs may be configured in the higher layer parameter srs-ConfigApDCI-Format4, ConfigApDCI-Format0, srs-ConfigApDCI-Format1a2b2c with the following values:

| | |
|---|---|
| SRS-ConfigAp-r16 ::= | SEQUENCE { |
| srs-AntennaPortAp-r16 | SRS-AntennaPort, |
| srs-BandwidthAp-r16 | ENUMERATED {bw0, bw1, bw2, bw3}, |
| freqDomainPositionAp-r16 | INTEGER (0..23), |
| transmissionCombAp-r16 | INTEGER (0..3), |
| cyclicShiftAp-r16 | ENUMERATED {cs0, cs1, cs2, cs3, cs4, |
| cs5, cs6, cs7, cs8, cs9, cs10, cs11}, | |
| transmissionCombNum-r16 | ENUMERATED {n2, n4} |
| nSRS-Identity-r16 | INTEGER (0..503) |
| nSRS-Identity 1-r16 | INTEGER (0..503)} |

If only one Cell-ID-SRS is configured, the UE would apply the configured Cell-ID-SRS as the virtual cell ID for SRS.

If two or more Cell-ID-SRSs are configured, the eNB would determine a single Cell-ID-SRS for the UE, for example, by means of an indicator.

The eNB may include a Cell-ID-SRS-indicator in the DCI and send the DCI to the UE with a positive SRS request value. Each value of the Cell-ID-SRS-indicator corresponds to a Cell-ID-SRS that is defined by the higher layer signaling. The UE acquires the virtual cell ID for SRS according the decoded DCI and selects the Cell-ID-SRS corresponding to the virtual cell ID from the received Cell-ID-SRSs via higher layer signaling.

As an example, two Cell-ID-SRSs are included in an aperiodic-SRS parameter set. Cell ID 1 is a virtual cell ID $N_{ID}^{SRS}$, and Cell ID 2 is the same as $N_{ID}^{cell}$. When this SRS parameter set is triggered by a DCI and the Cell-ID-SRS-indicator in the DCI is '0', the UE would use $N_{ID}^{SRS}$ to generate the SRS sequence. If the Cell-ID-SRS-indicator in the DCI is '1', UE would use $N_{ID}^{cell}$ to generate the SRS sequence.

Alternatively, the eNB could send the Cell-ID-SRS-indicator via a MAC CE selection command. In this condition, when the UE receives the trigger for SRS transmission, the UE generates the SRS sequence based on the Cell-ID-SRS-indicator received via the MAC CE selection command.

The UE should use the virtual cell ID for SRS corresponding to the Cell-ID-SRS-indicator no earlier than subframe n+M (M≥4) after the HARQ-ACK corresponding to the PDSCH carrying the selection command is transmitted in subframe n, in which M is predetermined between the eNB and the UE.

As a whole, the UE would determine the virtual cell identity for SRS sequence generation as follows:

Sounding reference signals:

$$n_{ID}^{RS} = N_{ID}^{cell}$$

if no value for $$n_{ID}^{SRS}$$

is configured by higher layers, $$n_{ID}^{RS} = n_{ID}^{SRS}$$

otherwise.

Figure 8:
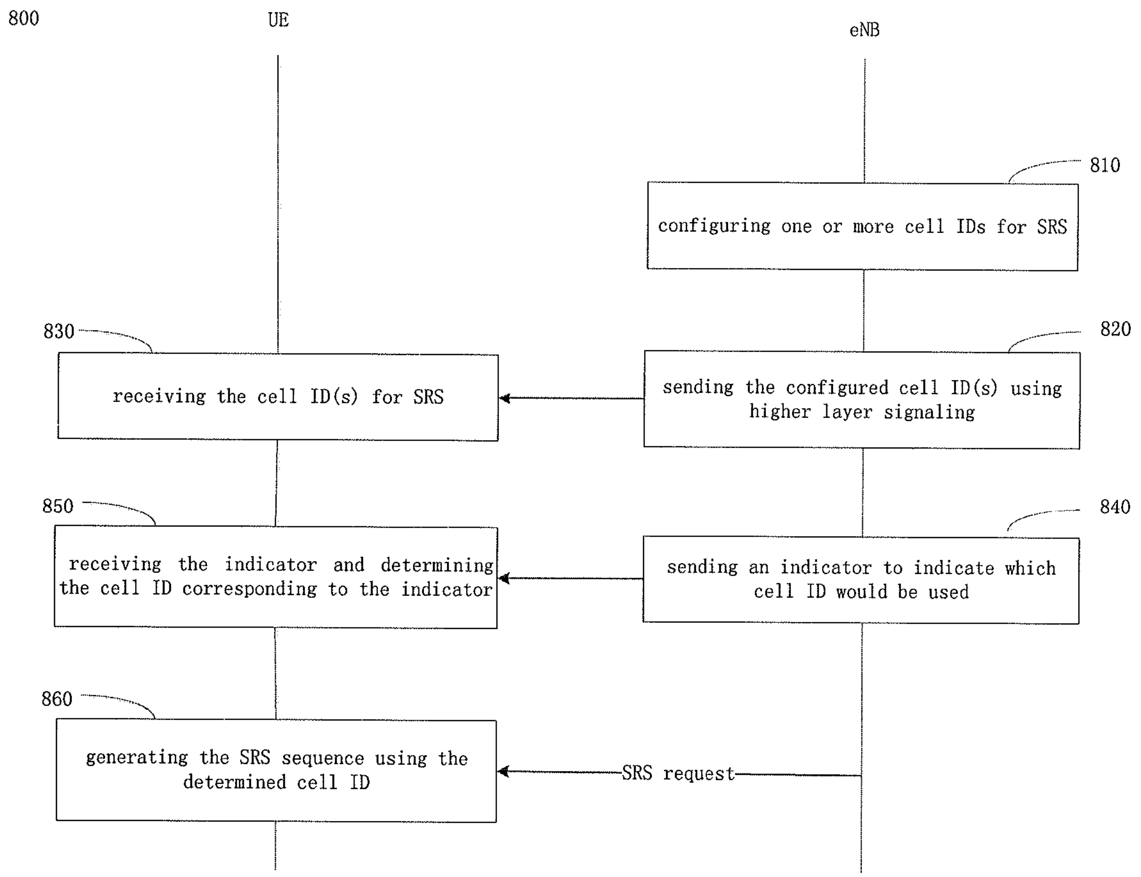
FIG. 8 is a flow chart diagram illustrating configuring virtual IDs for SRS.

FIG. 8 depicts a method (800) for configuring virtual IDs for SRS. In step 810, the eNB configures one or more cell IDs for SRS. In step 820, the eNB sends the configured cell ID(s) to the UE using higher layer signaling. In step 830, the UE receives the cell ID(s) for SRS. In the condition that more than one cell ID is configured, in step 840, the eNB would send an indicator to the UE to indicate which cell ID would be used. In step 850, the UE receives the indicator and determines the cell ID corresponding to the indicator. In step 860, upon receiving a SRS request, the UE generates the SRS sequence using the determined cell ID.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

determining a reserved subframe only usable for sounding reference signal (SRS) transmission, wherein one or more orthogonal frequency division multiplexing (OFDM) symbols of the reserved subframe are used for the SRS transmission;

transmitting information indicating the reserved subframe, wherein the information:

comprises a 14-bit bitmap, each bit of the 14-bit bitmap corresponding to a respective OFDM symbol of the reserved subframe; and indicates, based on a value of each bit of the 14-bit bitmap, whether a corresponding OFDM symbol of the reserved subframe is used for SRS transmission;

configuring a plurality of SRS transmission types for the reserved subframe, wherein a first SRS transmission type and a second SRS transmission type are associated with different SRS transmission parameter groups; and transmitting an SRS configuration format comprising a first indicator indicating the first SRS transmission type and a second indicator indicating the second SRS transmission type.

2. The method of claim 1, wherein one or two symbols in the reserved subframe is usable for one SRS resource of one user equipment (UE).

3. The method of claim 2, wherein if two symbols in the reserved subframe are used for one SRS resource of one user equipment (UE), resource configuration parameters for the one UE include an orthogonal cover code index.

4. The method of claim 2, wherein the reserved subframe is determined by radio resource control signaling.

5. The method of claim 2, wherein the reserved subframe is configured periodically or aperiodically.

6. The method of claim 1, wherein:

transmitting the information comprises transmitting the information to a user equipment (UE) of a plurality of UEs; and each bit of the 14-bit bitmap is used to indicate whether the symbols in the reserved subframe corresponding to the bit corresponds to the UE.

7. The method of claim 1, further comprising:

configuring more than one cell identifier for SRS transmission by radio resource control signaling; and sending a medium access control control element (MAC CE) to indicate one of the more than one cell identifier as a virtual cell identifier for SRS transmission.

8. The method of claim 7, wherein the virtual cell identifier for SRS transmission indicated by the MAC CE is valid after M subframes from a subframe on which a hybrid automated repeat request acknowledgment corresponding to a physical downlink shared channel transmission carrying the MAC CE is transmitted, wherein Mis greater than or equal to 4.

9. A base station, comprising:

at least one memory; and at least one processor coupled with the at least one memory and configured to cause the base station to:

determine a reserved subframe only usable for sounding reference signal (SRS) transmission, wherein one or more orthogonal frequency division multiplexing (OFDM) symbols of the reserved subframe are used for the SRS transmission;

transmit information indicating the reserved subframe, wherein the information:

comprises a 14-bit bitmap, each bit of the 14-bit bitmap corresponding to a respective OFDM symbol of the reserved subframe; and indicates, based on a value of each bit of the 14-bit bitmap, whether a corresponding OFDM symbol of the reserved subframe is used for SRS transmission;

configure a plurality of SRS transmission types for the reserved subframe, wherein a first SRS transmission type and a second SRS transmission type are associated with different SRS transmission parameter groups; and transmit an SRS configuration format comprising a first indicator indicating the first SRS transmission type and a second indicator indicating the second SRS transmission type.

10. The base station of claim 9, wherein one or two symbols in the reserved subframe is usable for one SRS resource of one user equipment (UE).

11. The base station of claim 10, wherein if two symbols in the reserved subframe are used for one SRS resource of one user equipment (UE), resource configuration parameters for the one UE include an orthogonal cover code index.

12. The base station of claim 10, wherein the reserved subframe is determined by radio resource control signaling.

13. The base station of claim 10, wherein the reserved subframe is configured periodically or aperiodically.

14. The base station of claim 9, wherein the 14-bit bitmap is used to indicate which symbols in the reserved subframe correspond to each user equipment (UE) in a plurality of UEs.

15. The base station of claim 9, wherein the at least one processor is configured to cause the base station to:

configure more than one cell identifier for SRS transmission by radio resource control signaling; and send a medium access control control element (MAC CE) to indicate one of the more than one cell identifier as a virtual cell identifier for SRS transmission.

16. The base station of claim 15, wherein the virtual cell identifier for SRS transmission indicated by the MAC CE is valid after M subframes from a subframe on which a hybrid automated repeat request acknowledgment corresponding to a physical downlink shared channel transmission carrying the MAC CE is transmitted, wherein Mis greater than or equal to 4.

17. A method performed by a user equipment (UE), the method comprising:

receiving information indicating a reserved subframe only usable for sounding reference signal (SRS) transmission, wherein one or more orthogonal frequency division multiplexing (OFDM) symbols of the reserved subframe are used for the SRS transmission, and wherein the information:

comprises a 14-bit bitmap, each bit of the 14-bit bitmap corresponding to a respective OFDM symbol of the reserved subframe;

indicates, based on a value of each bit of the 14-bit bitmap, whether a corresponding OFDM symbol of the reserved subframe is used for SRS transmission;

receiving configuration information configuring a plurality of SRS transmission types for the reserved subframe, wherein a first SRS transmission type is associated with a first group of SRS transmission parameters, and a second SRS transmission type is associated with a second group of SRS transmission parameters different from the first group of SRS transmission parameters;

determining, for each OFDM symbol of the reserved subframe, an SRS transmission type to be applied based on the 14-bit bitmap; and transmitting an SRS in one or more OFDM symbols of the reserved subframe in accordance with the determined SRS transmission type for each OFDM symbol.

18. The method of claim 17, wherein one or two symbols in the reserved subframe is used for one SRS resource of one user equipment (UE).

19. The method of claim 17, wherein the 14-bit bitmap is used to indicate which symbols in the reserved subframe correspond to each user equipment (UE) in a plurality of UEs.

20. A user equipment (UE), comprising:

at least one memory; and at least one processor coupled with the at least one memory and configured to cause the UE to:

receive information indicating a reserved subframe only usable for sounding reference signal (SRS) transmission, wherein one or more orthogonal frequency division multiplexing (OFDM) symbols of the reserved subframe are used for the SRS transmission, and wherein the information:

comprises a 14-bit bitmap, each bit of the 14-bit bitmap corresponding to a respective OFDM symbol of the reserved subframe;

indicates, based on a value of each bit of the 14-bit bitmap, whether a corresponding OFDM symbol of the reserved subframe is used for SRS transmission;

receive configuration information configuring a plurality of SRS transmission types for the reserved subframe, wherein a first SRS transmission type is associated with a first group of SRS transmission parameters, and a second SRS transmission type is associated with a second group of SRS transmission parameters different from the first group of SRS transmission parameters;

determine, for each OFDM symbol of the reserved subframe, an SRS transmission type to be applied based on the 14-bit bitmap; and transmit an SRS in one or more OFDM symbols of the reserved subframe in accordance with the determined SRS transmission type for each OFDM symbol.

* * * * *